United States Patent
Gill et al.

(10) Patent No.: US 7,280,314 B2
(45) Date of Patent: Oct. 9, 2007

(54) LOWER SATURATION FIELD STRUCTURE FOR PERPENDICULAR AFC POLE

(75) Inventors: Hardayal Singh Gill, Palo Alto, CA (US); James Mac Freitag, San Jose, CA (US); Yimin Hsu, Sunnyvale, CA (US); Yinshi Liu, Foster City, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 471 days.

(21) Appl. No.: 10/883,345

(22) Filed: Jun. 30, 2004

(65) Prior Publication Data

US 2006/0002015 A1   Jan. 5, 2006

(51) Int. Cl.
*G11B 5/127* (2006.01)
(52) U.S. Cl. .................................... 360/125
(58) Field of Classification Search ............ 360/126, 360/125
See application file for complete search history.

(56) References Cited

U.S. PATENT DOCUMENTS

| | | | | |
|---|---|---|---|---|
| 4,814,921 A | * | 3/1989 | Hamakawa et al. | 360/126 |
| 5,379,172 A | * | 1/1995 | Liao | 360/126 |
| 5,550,796 A | * | 8/1996 | Ishii | 369/13.17 |
| 5,864,450 A | | 1/1999 | Chen et al. | 360/113 |
| 5,940,253 A | * | 8/1999 | Mallary et al. | 360/126 |
| 6,233,116 B1 | * | 5/2001 | Chen et al. | 360/126 |
| 6,243,939 B1 | | 6/2001 | Chen et al. | 29/603.14 |
| 6,259,583 B1 | * | 7/2001 | Fontana et al. | 360/126 |
| 6,524,491 B1 | | 2/2003 | Liu et al. | 216/22 |
| 6,791,796 B2 | * | 9/2004 | Shukh et al. | 360/126 |
| 6,885,520 B2 | * | 4/2005 | Fievre et al. | 360/126 |
| 7,064,924 B2 | * | 6/2006 | Ju et al. | 360/126 |
| 2002/0027750 A1 | | 3/2002 | Shukh et al. | 360/317 |
| 2003/0002212 A1 | | 1/2003 | Chen et al. | 360/126 |
| 2004/0075927 A1 | | 4/2004 | Gill | 360/55 |

FOREIGN PATENT DOCUMENTS

JP     2154405 A     6/1990

* cited by examiner

*Primary Examiner*—Angel Castro
(74) *Attorney, Agent, or Firm*—Zilka-Kotab, PC

(57) ABSTRACT

A magnetic write head for perpendicular magnetic recording having a laminated write pole with improved low saturation field.

22 Claims, 5 Drawing Sheets

LOWER SATURATION FIELD STRUCTURE FOR PERPENDICULAR AFC POLE

FIELD OF THE INVENTION

The present invention relates to giant magnetoresistive (GMR) sensors and more particularly to a sensor having improved pinned layer stability.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of a rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers; hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

In efforts to meet the ever increasing demands for improved data rate and data capacity, researchers have recently focused on the use of perpendicular recording. In a conventional, longitudinal recording system, data is recorded as magnetic transitions oriented longitudinally on a magnetic disk. In such a longitudinal system, a write element has a write gap disposed between two write poles, and a magnetic fringing field extending from one write pole to the other writes the longitudinal bits of data.

In a perpendicular recording system, however, data is recorded as magnetic transitions oriented perpendicular to the surface of the disk. A perpendicular write element includes a write pole having a very small cross section and a return pole having a much larger cross section. The write pole emits a strong, highly concentrated magnetic field directly toward the disk in a direction perpendicular to the surface of the disk. The disk has a magnetically soft (low coercivity) under layer and a thinner, magnetically hard (high coercivity) upper layer. Since the field emitted from the write pole is very strong and highly concentrated it is sufficient to overcome the high coercivity of the upper layer and thereby magnetize the upper layer. The resulting magnetic flux in the disk travels through the soft underlayer of the disk to the return pole where it passes through the high coercivity upper layer in a much more spread out pattern. Because the magnetic flux at the return pole is sufficiently spread out, it does not overcome the coercivity of the upper layer of the magnetic disk and, therefore, does not erase the bit recorded by the write head.

The write pole of such a perpendicular write head is preferably constructed very small in order to produce a small magnetic bit of data. The use of such small write poles, however, results in magnetic remanence. In a much larger magnetic pole of a traditional longitudinal write head the poles are sufficiently large to allow the formation of magnetic domains. This allows the poles to demagnetize once the field from the coil is removed. However, a perpendicular write pole is so small that such domains cannot form. This means that the write pole cannot demagnetize after the magnetic field from the coil has been removed. A write pole that remains magnetized will inadvertently erase bits of data that were not meant to be erased.

One method for reducing such remanence is to form the write pole as a plurality of laminated layers of magnetic material separated by layers of non magnetic material such as Ru or Cr. This allows the magnetic layers within the write head to form antiparallel domains and thereby demagnetize after the magnetic field from the coil has been removed. Such a write head is described in US Patent Application Publication U.S. 2004/0075927 entitled FLUX CLOSED SINGLE POLE PERPENDICULAR HEAD FOR ULTRA NARROW TRACK, which is incorporated herein by reference. Such laminated write poles have been referred to as antiferromatically (AFC) coupled write poles.

One problem that results from the use of such a laminated AFC write pole is that they have a high saturation field. As those skilled in the art will appreciate, the write pole should be magnetically saturated during writing, so a high saturation field (ie. high reluctance and low permeability) results in decreased writing efficiency. The saturation field is directly proportional to the coupling strength between the ferromagnetic layers across the non-magnetic spacer layer. The materials that have been used include CoFe magnetic layers separated by Ru spacer layers. CoFe has been used to provide the necessary high magnetic moment, however as mentioned above, such systems suffer from high saturation field.

Therefore, there remains a need for a write pole for use in a perpendicular recording system that can provide high magnetic moment, and avoid remanence while also having a low saturation field (ie. low reluctance, and high permeability).

SUMMARY OF THE INVENTION

The present invention provides a write pole having a laminated structure that provides high magnetization while also eliminating remanence and having a low saturation field. The write pole includes multiple antiferomagnetically coupled magnetic layers separated by a non-magnetic coupling layer. The layers include a thin coupling layer and a thin layer of NiFe at either side of the coupling layer. In other words the coupling layer is sandwiched between thin layers of NiFe. Much thicker layers of CoFe are formed at either side of the NiFe layer, so that the coupling layer and the NiFe layers are sandwiched between the relatively thicker CoFe layers.

The presence of NiFe adjacent to the coupling layer advantageously reduces coupling strength and thereby reduces saturation field. In fact a Ni/Ru/Ni system has about ¼ the coupling strength of a CoFe/Ru/CoFe system.

Since the majority of the magnetic material still comprises CoFe, the desired high magnetization of the write head is maintained. This allows the write pole to achieve the low saturation field benefits of NiFe while also having the high moment benefits of CoFe.

The NiFe layers are preferably very thin, and can be 10 to 20 Angstroms thick. The CoFe layers are preferably much thicker, and can be 100 to 300 Angstroms thick or about 200 Angstroms thick. The coupling layer can be a material such as Ru or Cr, preferably Ru, and can be about 4 Angstroms thick or 4 to 10 Angstroms thick.

The NiFe can have a Fe concentration of 50 to 60 atomic percent Fe or about 55 atomic percent Fe. The NiFe could also be have a concentration of 15 to 25 atomic percent Fe or about 20 atomic percent Fe.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
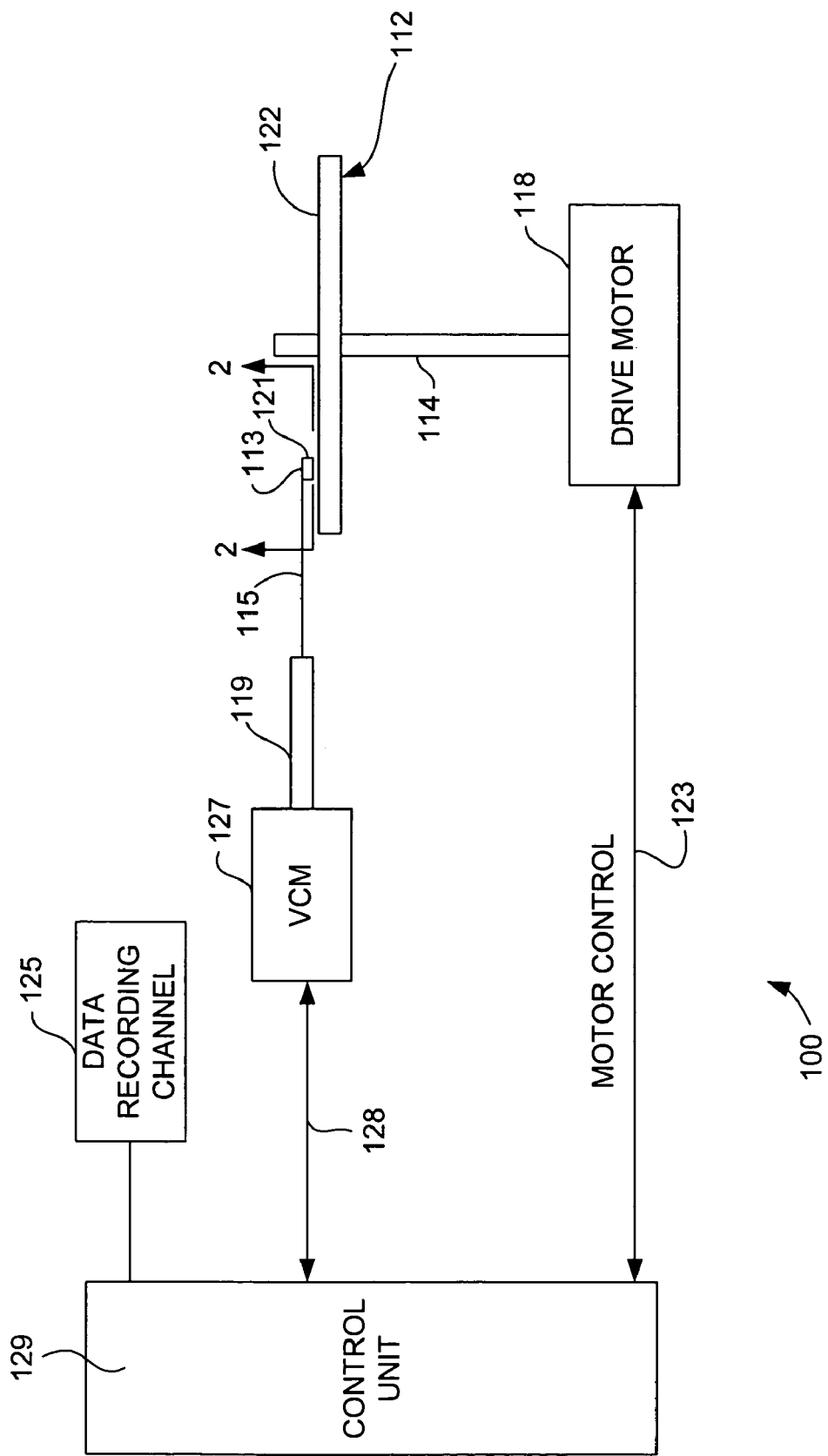
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
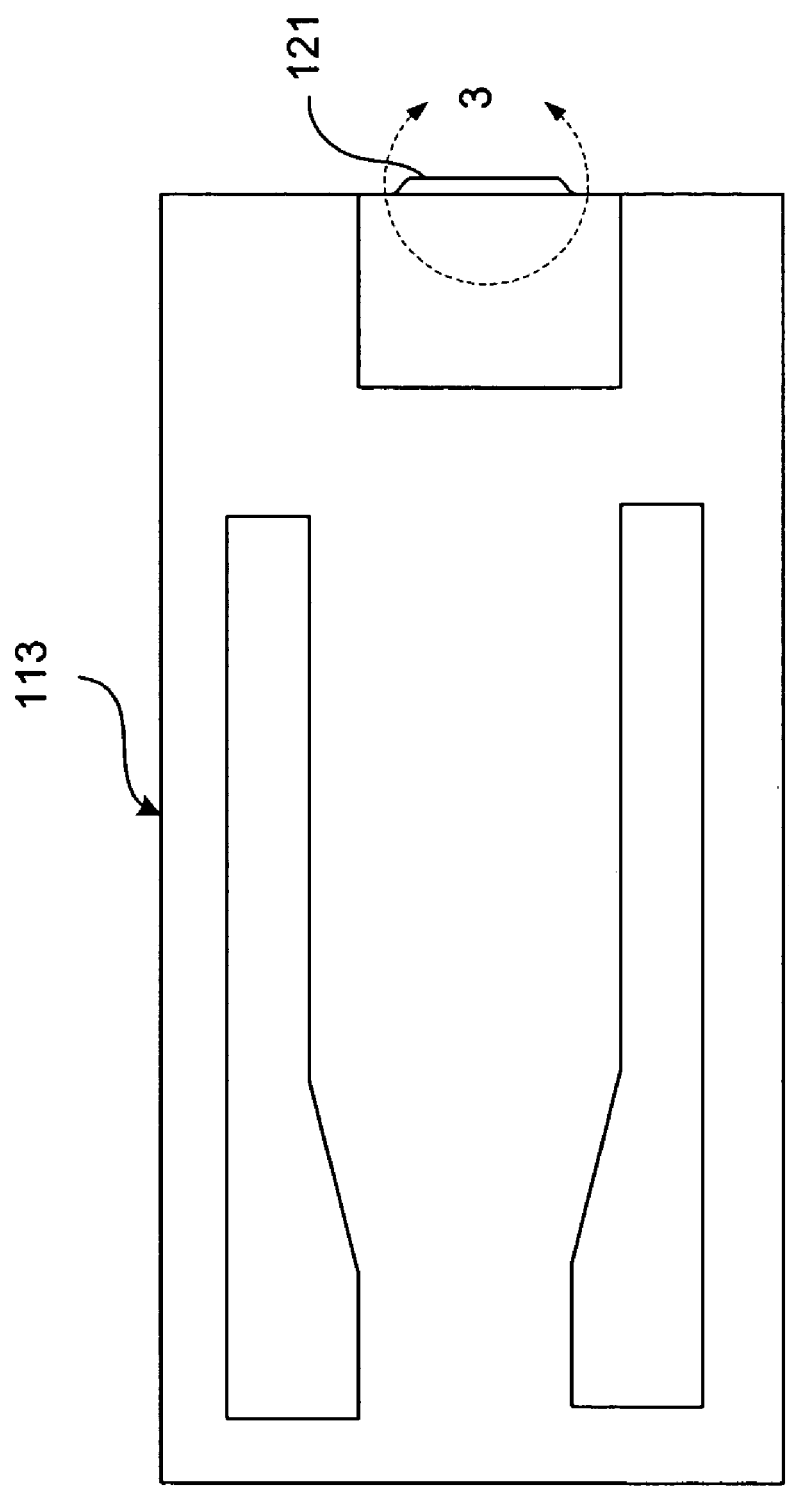
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head 121 including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
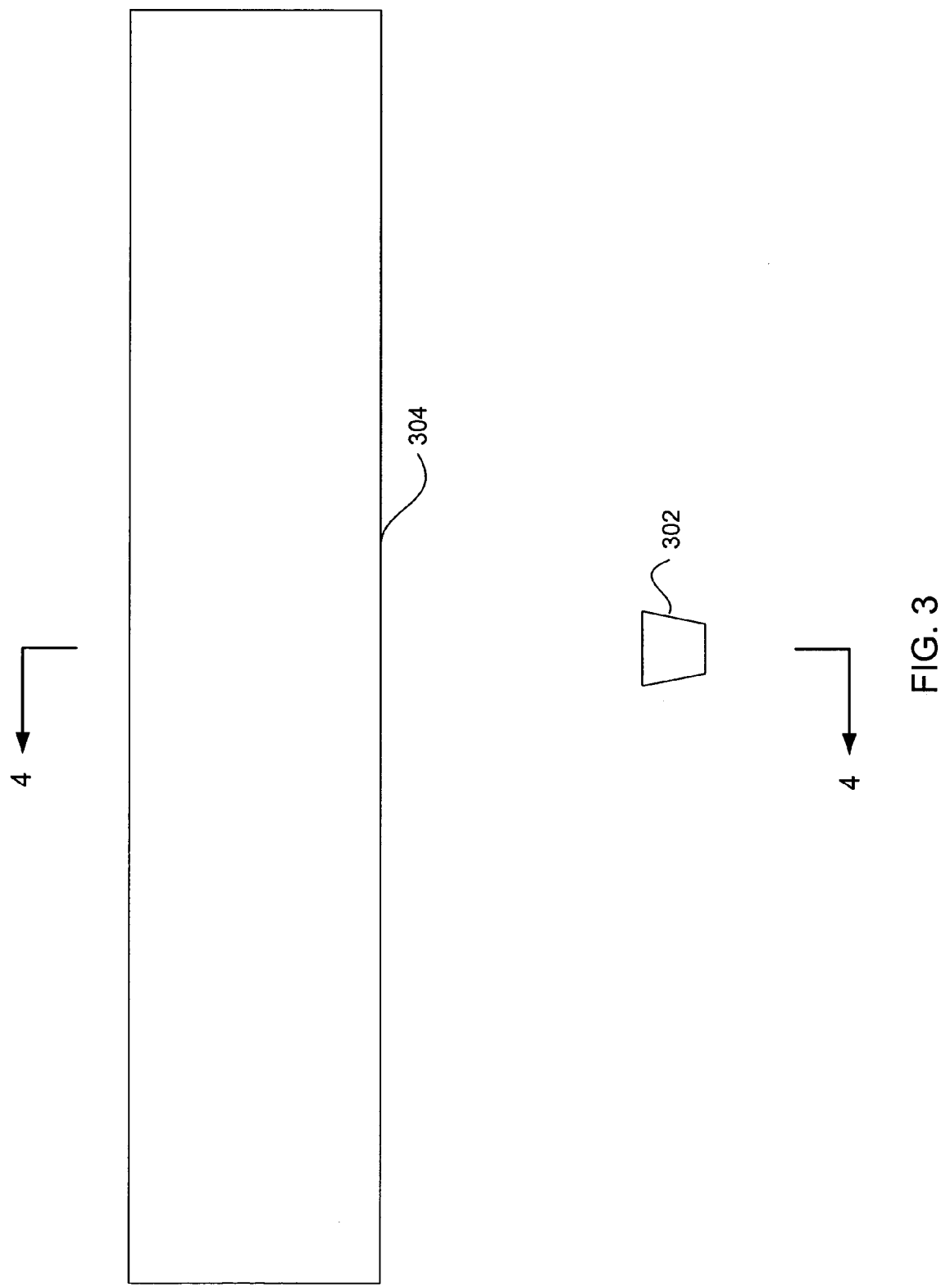
FIG. 3 is an ABS view of a perpendicular magnetic write head according to an embodiment of the present invention taken from circle 3 of FIG. 2.
Figure 4:
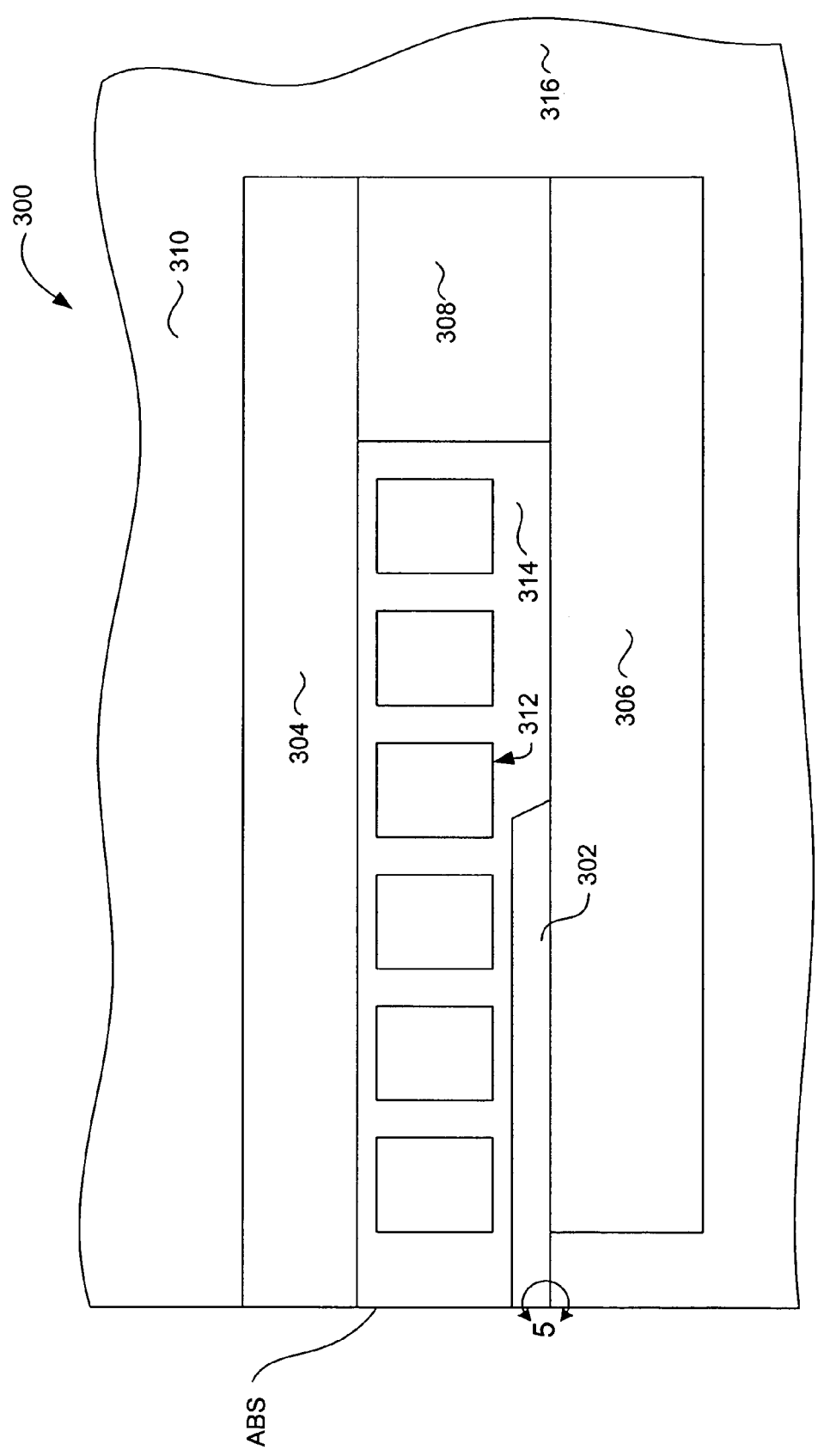
FIG. 4 is a side cross sectional view taken from line 4-4 of FIG. 3.

With reference now to FIGS. 3 and 4, a perpendicular write head 300 is described. The write head includes a write pole 302 and a return pole 304. As can be seen with reference to FIG. 3, which is an ABS view showing the write pole 302 and return pole 304, it can be seen that the write pole 302 has a much smaller cross section than the return pole 304. The write pole also preferably has a trapezoidal shape, which prevents of track writing due to skew when the slider 113 (FIG. 1) is located at extreme inner or outer portions of the disk 122 (FIG. 1). As will be appreciated by those skilled in the art, highly concentrated flux emitted from the write pole 302 will return to the return pole 304 much more spread out, thereby avoiding erasure of the magnetic when the magnetic field returns to the return pole 304. The return pole can be constructed of a magnetic material such as NiFe and can be constructed by electroplating.

With reference now to FIGS. 3 and 4 the write pole 302 is connected with a shaping layer 306, which can be constructed of a magnetic material such as NiFe and can be formed by electroplating. The shaping layer 306 and return pole 304 are connected by a back gap 308, which can also be constructed of a magnetic material such as NiFe and can be electroplated. The shaping layer 306 and back gap 308 form a magnetic circuit or yoke 310 that magnetically connects the write pole 302 with the return pole 304. An electrically conductive coil 312 (shown only partially and in cross section in FIG. 4) passes through the magnetic yoke 310 between the write pole and shaping layer 302, 306 and the return pole 304. The coil is constructed of an electrically conductive material such as Cu and is electrically isolated from the yoke 310 by an insulation layer 314 which may be for example $Al_2O_3$. The yoke 310 may also be enclosed within an insulating material 316 which may also be $Al_2O_3$, with write pole 302 and return pole 304 being exposed at the air bearing surface (ABS).

During operation, an electrical current flowing through the coil induces a magnetic flux through the yoke 310. This magnetic flux passes through the shaping layer 306 and is funneled into the much smaller write pole 302. In the write pole 302 the magnetic flux is highly concentrated and results in a highly concentrated magnetic field being emitted from the tip of the write pole 302 at the ABS. After being emitted from the write pole 302, the field passes to the magnetic disk (not shown in FIG. 4). The resulting magnetic flux travels through the disk to return to the return pole 304 where it is much more spread out and weaker.

Figure 5:
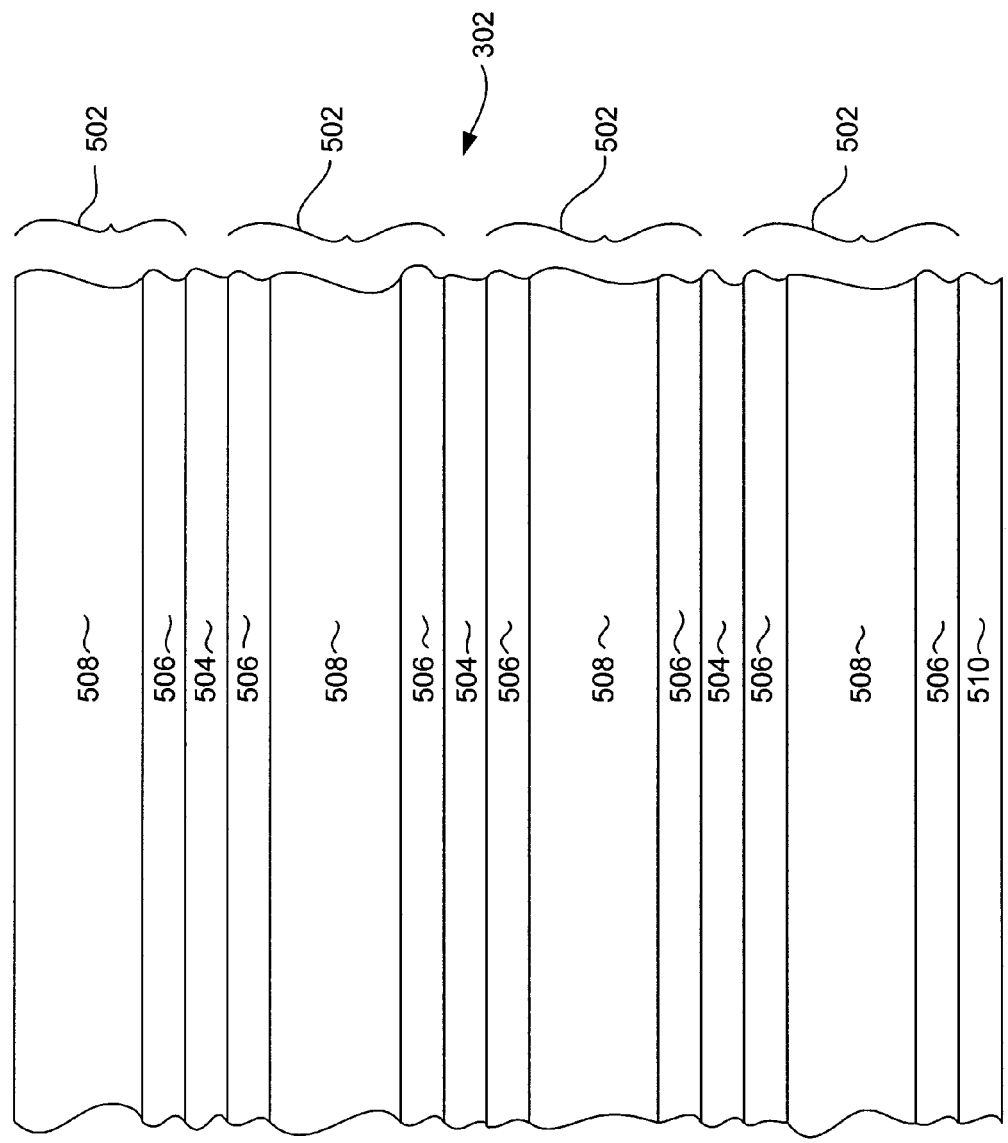
FIG. 5 is an enlarged view taken from circle 5 of FIG. 4.

With reference now to FIG. 5, the write pole 302 is constructed as a repeating sequence of magnetic layers 502 separated by non-magnetic coupling layers 504. The coupling layers 504 can be for example Ru or Cr (preferably Ru) and can be 4 to 8 Angstroms thick or about 4 Angstroms thick.

Each of the magnetic layers 502 includes a thin layer of NiFe 506 located adjacent the coupling layer 504 and a much thicker layer of CoFe 508 formed between the NiFe layers 506. The structure could also be described as a coupling layer 504 sandwiched between two NiFe layers 506 all of which are sandwiched between two CoFe layers 508.

The NiFe layers 506 constructed very thin and can be 10 to 20 Angstroms thick. The NiFe layer can be constructed of $Ni_{45}Fe_{55}$ or of $Ni_{80}Fe_{20}$, and is preferably constructed of $Ni_{45}Fe_{55}$. The $Ni_{45}Fe_{55}$ can have a Fe concentration ranging from 50 to 60 atomic percent, and the $Ni_{80}Fe_{20}$ can have a Fe concentration ranging from 15 to 25 atomic percent. The CoFe layers 508 are constructed much thicker and can be 100 to 300 Angstroms or about 200 Agnstroms thick.

In addition, the write pole 302 can be formed upon a seed layer 510, which can be for example NiCr having a thickness of about 50 Angstroms. The may also be a cap layer (not shown) at the top of the write pole 302, which may also be NiCr having a thickness of about 50 Angstroms. The various layers 504-510 can be deposited by sputtering, such as in a magnetron sputtering tool, or can be deposited by electroplating.

The NiFe layers 506 adjacent to the coupling layer 504 reduce the saturation field by reducing the coupling strength across the coupling layer 504. However, since the vast majority of the magnetic layers 504 consists of the higher moment CoFe, magnetic moment of the write pole 302 is not appreciably reduced.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic write element for perpendicular recording, comprising:
   a magnetic write pole;
   a magnetic return pole magnetically connected with the write pole; and
   an electrically conductive coil disposed between the write pole and the return pole;
   the magnetic write pole further comprising:
   a Cr layer;
   first and second layers of NiFe, the Cr layer being sandwiched between the first and second layers of NiFe
   first and second layers of CoFe, the Cr layer and the first and second layers of NiFe being sandwiched between the first and second layers of CoFe.

2. A magnetic write element as in claim 1 wherein the first and second layers of CoFe are substantially thicker than the Cr layer and the first and second layers of NiFe.

3. A magnetic write element as in claim 1, wherein the first and second layers of NiFe are each 10-20 Angstroms thick.

4. A magnetic write element as in claim 1, wherein the first and second layers of CoFe are each 100-300 Angstroms thick.

5. A magnetic write element as in claim 1, wherein the first and second layer of NiFe are each 10-20 Angstroms thick and the first and second layers of CoFe are each 100-300 Angstroms thick.

6. A magnetic write element as in claim 1, wherein:
the first and second layer of NiFe are each 10-20 Angstroms thick;
the first and second layers of CoFe are each 100-200 Angstroms thick; and
the Cr layer is 4 to 10 Angstroms thick.

7. A magnetic write element as in claim 1 wherein the first and second layers of NiFe each comprise NiFe having 50 to 60 atomic percent Fe.

8. A magnetic write element as in claim 1 wherein the first and second layers of NiFe each comprise NiFe having about 55 atomic percent Fe.

9. A magnetic write element as in claim 1 wherein the first and second layers of NiFe each comprise NiFe having 15 to 25 atomic percent Fe.

10. A magnetic write element as in claim 1 wherein the first and second layers of NiFe each comprise NiFe having about 20 atomic percent Fe.

11. A magnetic write element as in claim 1 wherein the Cr layer is of such a thickness as to antiparallel couple the first and second layers of NiFe.

12. A magnetic write element for perpendicular magnetic recording, comprising:
a write pole comprising a repeating sequence of layers, the sequence comprising:
a layer of CoFe;
a first layer of NiFe;
Cr layer; and
a second layer of NiFe.

13. A magnetic write element as in claim 12 wherein the first and second layers of NiFe each have a thickness of 10-20 Angstroms.

14. A magnetic write element as in claim 12 wherein the layer of CoFe has a thickness of 100-300 Angstroms.

15. A magnetic write element as in claim 12 wherein the layer of CoFe has a thickness of about 200 Angstroms.

16. A magnetic write element as in claim 12 wherein the first and second layers of NiFe each have a thickness of 10-20 Angstroms and the CoFe layer has a thickness of 100-300 Angstroms.

17. A magnetic write element as in claim 12 wherein the first and second NiFe layers each comprise NiFe having 50 to 60 atomic percent Fe.

18. A magnetic write element as in claim 12 wherein the first and second NiFe layers each comprise NiFe having about 55 atomic percent Fe.

19. A magnetic write element as in claim 12 wherein the first and second NiFe layers each comprise NiFe having 15 to 25 atomic percent Fe.

20. A magnetic write element as in claim 12 wherein the first and second NiFe layers each comprise NiFe having about 20 atomic percent Fe.

21. A magnetic write element as in claim 12 wherein the coupling layer has a thickness of 4 to 10 Angstroms.

22. A magnetic data recording system, comprising:
a magnetic disk;
an actuator;
a slider connected with the actuator for movement adjacent to the magnetic disk;
a magnetoresistive sensor connected with the slider;
an inductive write element connected with the slider, the inductive write element further comprising:
a write pole comprising, a repeating sequence of layers, the sequence comprising:
a layer of CoFe;
a first layer of NiFe;
Cr layer; and
a second layer of NiFe.

* * * * *